United States Patent
Kaneko et al.

(10) Patent No.: US 7,872,452 B2
(45) Date of Patent: *Jan. 18, 2011

(54) BATTERY PACK CAPACITY ADJUSTING DEVICE AND METHOD

(75) Inventors: Hiroshi Kaneko, Phoenix, AZ (US); Shinsuke Yoshida, Hadano (JP)

(73) Assignee: Nissan Motor Co., Ltd., Yokohama (JP)

( * ) Notice: Subject to any disclaimer, the term of this patent is extended or adjusted under 35 U.S.C. 154(b) by 497 days.

This patent is subject to a terminal disclaimer.

(21) Appl. No.: 11/960,129

(22) Filed: Dec. 19, 2007

(65) Prior Publication Data

US 2008/0157721 A1 Jul. 3, 2008

(30) Foreign Application Priority Data

Dec. 28, 2006 (JP) ............................. 2006-354553
Dec. 4, 2007 (JP) ............................. 2007-313132

(51) Int. Cl.
H02J 7/00 (2006.01)
H02J 7/04 (2006.01)

(52) U.S. Cl. ..................................... 320/150; 320/136
(58) Field of Classification Search .................. 320/150, 320/136
See application file for complete search history.

(56) References Cited

U.S. PATENT DOCUMENTS

| | | | | |
|---|---|---|---|---|
| 5,482,793 A | * | 1/1996 | Burns et al. ................... | 429/62 |
| 5,739,670 A | * | 4/1998 | Brost et al. ................... | 320/131 |
| 6,344,728 B1 | * | 2/2002 | Kouzu et al. ................. | 320/116 |
| 6,700,351 B2 | * | 3/2004 | Blair et al. ................... | 320/125 |
| 7,612,533 B2 | * | 11/2009 | Morita et al. ............... | 320/132 |

FOREIGN PATENT DOCUMENTS

JP 2006-073364 A 3/2006

* cited by examiner

Primary Examiner—Edward Tso
Assistant Examiner—M'Baye Diao
(74) Attorney, Agent, or Firm—Global IP Counselors, LLP

(57) ABSTRACT

A battery pack capacity adjusting device for adjusting a capacity of a battery pack having a plurality of secondary cells includes a control circuit board and a control section. The control circuit board is installable in the battery pack, and includes a capacity adjusting section to be electrically connected to the secondary cells to adjust a capacity of each of the secondary cells. The control section is configured to determine a number of the secondary cells whose capacities are adjustable together based on a relationship between a heat radiation amount of the control circuit board and a heat emission amount of the capacity adjusting section, and to control the capacity adjusting section to adjust the capacities of the number of the secondary cells that were determined to be adjustable together.

8 Claims, 8 Drawing Sheets

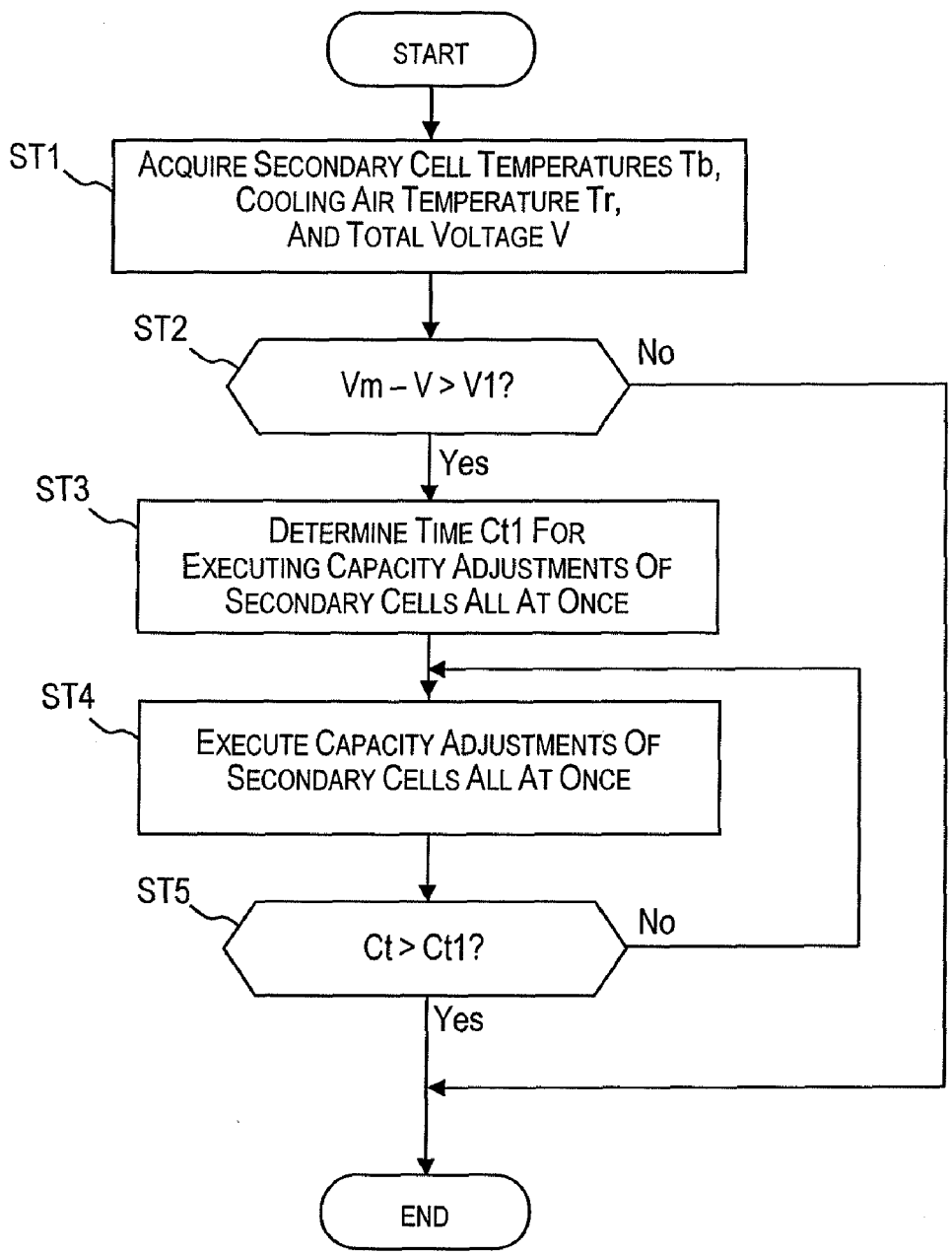
F I G. 3

BATTERY PACK CAPACITY ADJUSTING DEVICE AND METHOD

CROSS-REFERENCE TO RELATED APPLICATIONS

This application claims priority to Japanese Patent Application No. 2006-354553, filed on Dec. 28, 2006 and Japanese Patent Application No. 2007-313132, filed on Dec. 4, 2007. The entire disclosures of Japanese Patent Application Nos. 2006-354553 and 2007-313132 are hereby incorporated herein by reference.

BACKGROUND OF THE INVENTION

1. Field of the Invention

The present invention generally relates to a battery pack capacity adjusting device and method for adjusting a capacity of a battery pack having a plurality of secondary cells.

2. Background Information

When a battery pack having a plurality of cells (secondary cells) connected together is charged and discharged repeatedly and/or left unused for a period of time, capacity differences develop among the cells due to variation in the characteristics of the cells. If the battery pack is used in a state in which such capacity differences exist, there will be some cells that become overcharged or overdischarged, and the service life of the battery pack as a whole will be shortened. Therefore, the capacities of the individual cells are adjusted at a prescribed frequency to make them substantially uniform.

Organic solvents, such as ethylene carbonate, are used as electrolytes in lithium based secondary batteries such as lithium ion secondary batteries that have a positive electrode made of lithium cobalt oxide and a negative electrode made of carbon, and lithium secondary batteries that have a positive electrode made of lithium cobalt oxide and a negative electrode made of lithium metal. When a lithium based secondary battery is overcharged, the organic solvent decomposes and vaporizes, causing the encasement of the secondary battery to bulge abnormally. Additionally, since the organic solvent serving as the electrolyte evaporates, the charging capacity declines greatly the next time the secondary battery is charged.

Consequently, a method is employed with lithium based secondary batteries whereby the capacities of the individual cells are adjusted to be uniform by discharging the cells that have a larger capacity than the others. This capacity adjustment of the individual cells is accomplished by discharging the cells through bypass resistors connected in parallel with each of the cells for an amount of time corresponding to the capacity adjustment.

However, when capacity adjustment discharging is executed through a large number of the capacity adjustment bypass resistors, the amount of emitted heat from the resistors can become excessive. Thus, there is the possibility that a CPU and other electronic components coupled to the bypass resistor mounted on the control circuit board will be adversely affected by the heat. In order to address this issue, Japanese Laid-Open Patent Application Publication No. 2006-73364 proposes prohibiting the capacity adjustment of those cells whose charge capacities are not excessively uneven when the temperature of the circuit board, on which the capacity adjustment bypass resistors are mounted, exceeds a threshold value.

In view of the above, it will be apparent to those skilled in the art from this disclosure that there exists a need for an improved battery pack capacity adjusting device and method. This invention addresses this need in the art as well as other needs, which will become apparent to those skilled in the art from this disclosure.

SUMMARY OF THE INVENTION

Although the capacity adjustment method presented in the above mentioned reference is able to maintain a temperature that ensures the operation of the electronic components mounted on the control circuit board, such capacity adjustment method sometimes suppresses the heat emission amount more than is necessary because it does not take into account the relationship between the cooling effect of a cooling device and the heat emission amount of the bypass resistors. Consequently, the capacity adjustments of the individual cells are sometimes executed late.

Accordingly, one object of the present invention is to provide a battery pack capacity adjusting device and method that can shorten the time required for capacity adjustments of the secondary cells of the battery pack.

In order to achieve the above object, a battery pack capacity adjusting device for adjusting a capacity of a battery pack having a plurality of secondary cells includes a control circuit board and a control section. The control circuit board is installable in the battery pack, and includes a capacity adjusting section to be electrically connected to the secondary cells to adjust a capacity of each of the secondary cells. The control section is configured to determine a number of the secondary cells whose capacities are adjustable together based on a relationship between a heat radiation amount of the control circuit board and a heat emission amount of the capacity adjusting section, and to control the capacity adjusting section to adjust the capacities of the number of the secondary cells that were determined to be adjustable together.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a flowchart illustrating the control processing executed by the battery pack capacity adjusting device in accordance with a second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
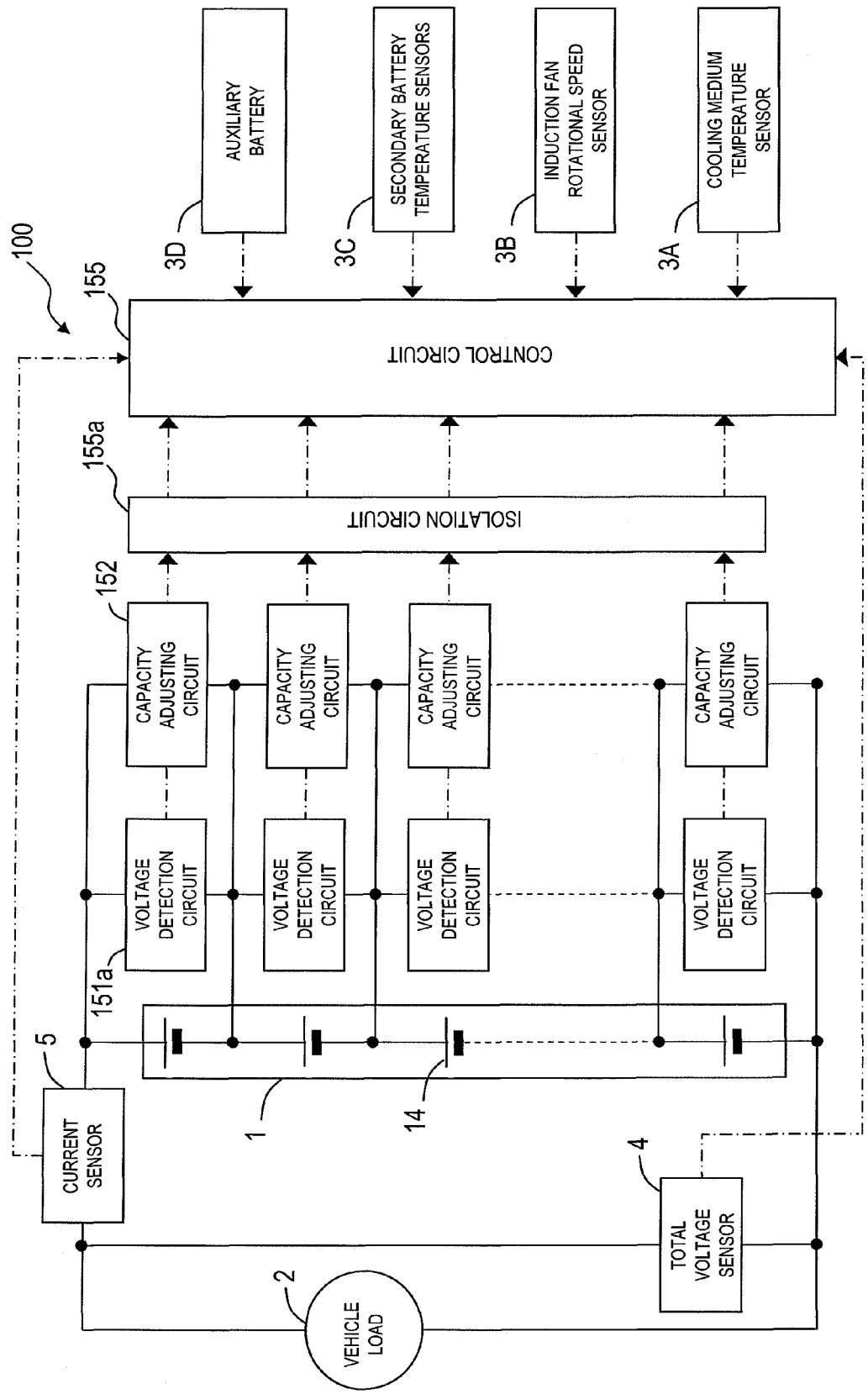
FIG. 1 is a block diagram of a battery pack system including a battery pack provided with a battery pack capacity adjusting device in accordance with a first embodiment of the present invention.
Figure 2:
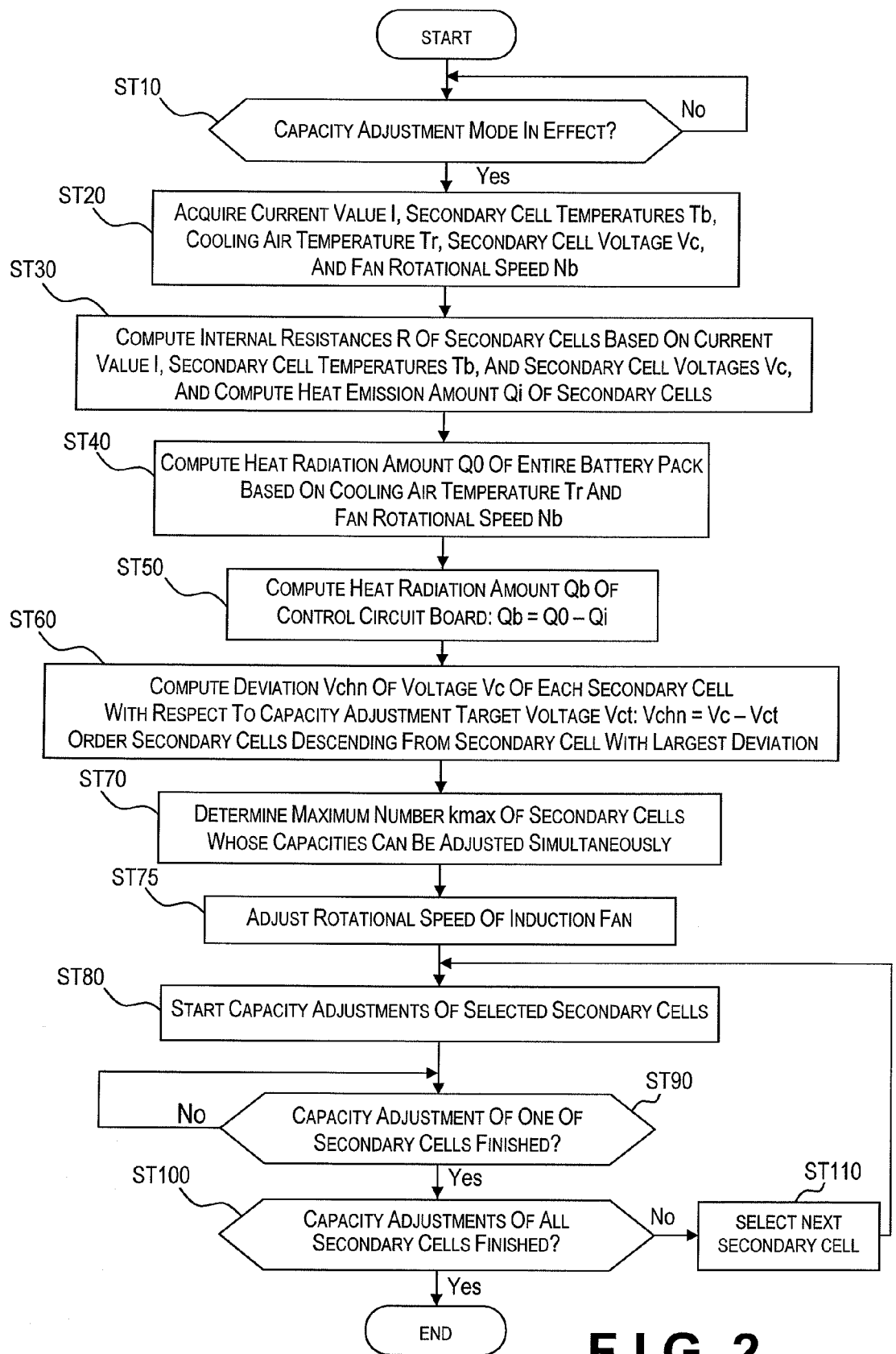
FIG. 2 is a flowchart illustrating the control processing executed by the battery pack capacity adjusting device in accordance with the first embodiment of the present invention.
Figure 6:
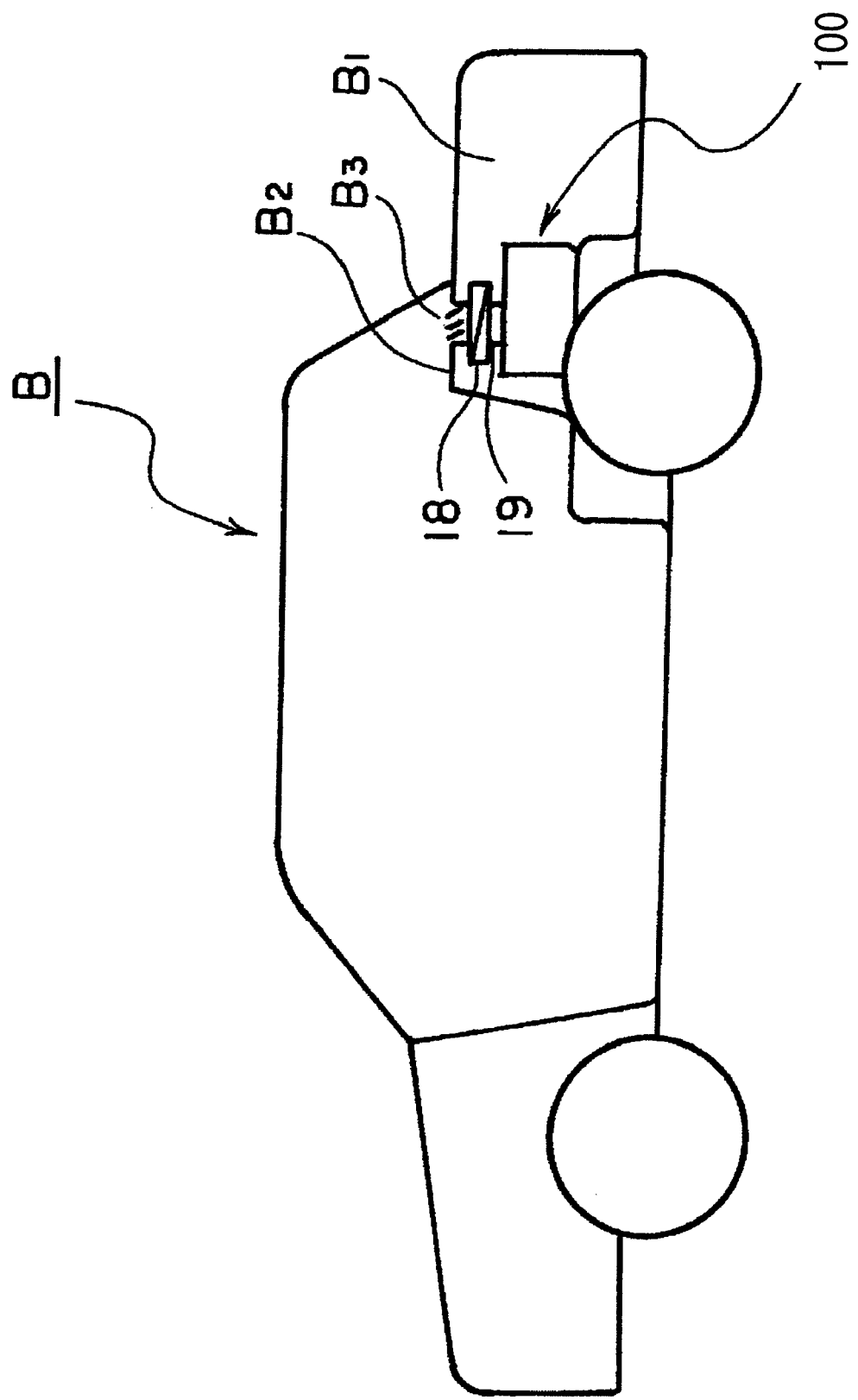
FIG. 6 is a schematic side view of an example of a vehicle in which the battery pack system of the first embodiment of the present invention is mounted.
Figure 7:
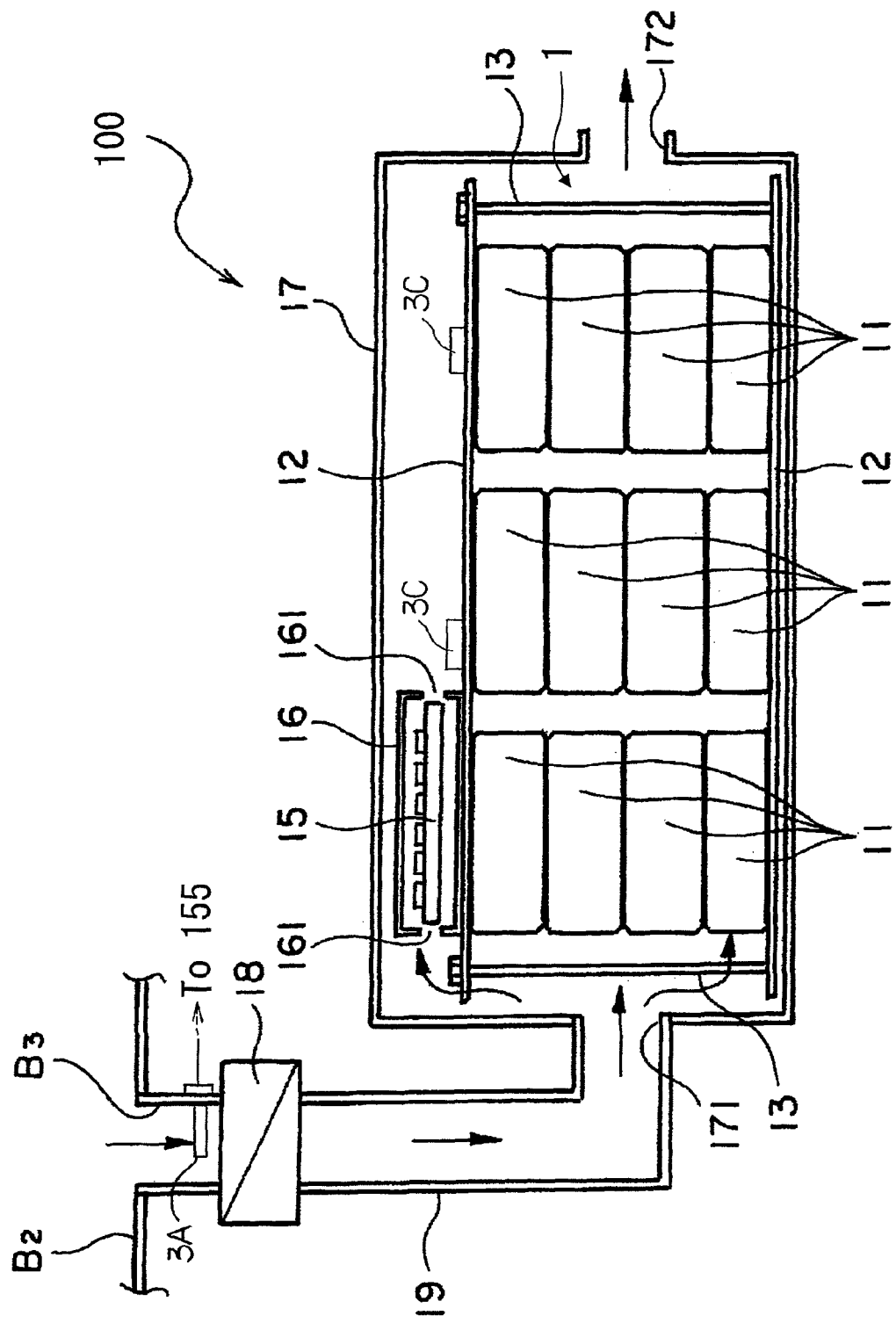
FIG. 7 is a cross sectional view of an example of the battery pack system of the first embodiment of the present invention.
Figure 8:
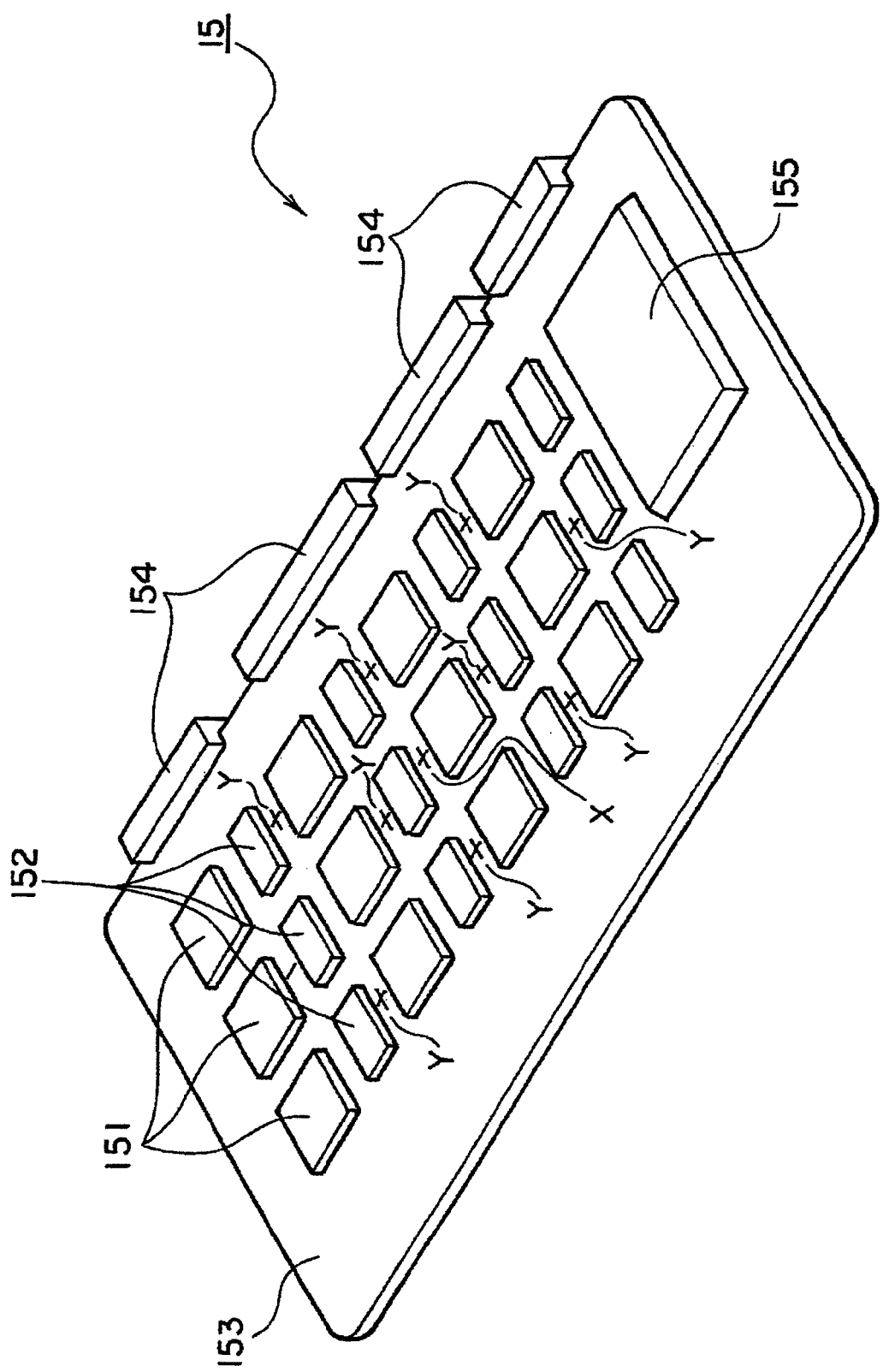
FIG. 8 is a simplified perspective view of an example of a control circuit board of the battery pack system in accordance with the first embodiment of the present invention.

Referring initially to FIGS. 1, 2 and 6-8, a battery pack capacity adjusting device is illustrated in accordance with a first embodiment of the present invention. FIG. 1 is a block diagram of a battery pack system 100 including a battery pack 1 and the battery pack capacity adjusting device of the first embodiment. FIG. 2 is a flowchart illustrating the control processing executed by the battery pack capacity adjusting device in accordance with the first embodiment. FIG. 6 is a schematic side view of an example of a vehicle B on which the battery pack system 100 of the first embodiment is mounted. FIG. 7 is a schematic cross sectional view of an example of a structure of the battery pack system 100 in accordance with the first embodiment. FIG. 8 is a simplified perspective view of an example of a control circuit board 15 of the battery pack system 100 in accordance with the first embodiment.

The examples of the structure of the battery pack system 100 in accordance with the first embodiment, which is installed in the vehicle B, will now be explained. In the example illustrated in FIG. 6, the vehicle B includes the battery pack system 100 installed inside a trunk compartment $B_1$ of the vehicle B. Moreover, an opening $B_3$ is provided in a rear parcel panel $B_2$ of the vehicle B and a duct 19 leads from the opening $B_3$ to the battery pack system 100 such that air from the passenger compartment (cabin) is guided to the inside of the battery pack system 100 in order to introduce cooling air into the battery pack system 100. In the present invention, the installation location of the battery pack system 100 in a vehicle is not limited to the location shown in FIG. 6. For example, the battery pack system 100 can also be installed inside the passenger compartment, under the floor, in the engine compartment, or the like.

As shown in FIG. 7, the battery pack system 100 includes the battery pack 1, a control circuit board 15 and a battery pack case 17. The battery pack 1 includes a plurality of battery units 11 arranged in stacks (stacks of four in FIG. 7) with the positive and negative terminals thereof connected together in series. Each of the battery units 11 further includes a plurality of thin secondary cells 14 (shown in FIG. 1) stacked on one another with the positive and negative terminals thereof connected together in series. A plurality of stacks of battery units 11 (e.g., three stacks in FIG. 7) is arranged in a row and the positive and negative terminals of the stacks are connected together in series. The battery pack 1 also includes a pair of upper and lower end plates 12 disposed on the upper and lower side of the stacks of the battery units 11, and a plurality of bolts 13 that fastens the upper and lower end plates 12 together.

The control circuit board 15 includes electrical components that are configured to control the individual secondary cells 14 (FIG. 1) making up the battery pack 1. The control circuit board 15 is housed inside a case 16, which is mounted on the upper end plate 12 as shown in FIG. 7. The control circuit board 15 includes a printed circuit board 153 on which a plurality of integrated circuits 151 and a plurality of capacity adjusting circuits 152 are mounted as shown in FIG. 8. The integrated circuits 151 are electronic components that are configured to control the individual secondary cells 14 (FIG. 1) making up the battery pack 1. The capacity adjusting circuits 152 are electronic components that are configured to adjust the capacities of the secondary cells 14 (FIG. 1). More specifically, each of the capacity adjusting circuits 152 includes a resistor that is configured and arranged to selectively discharge a corresponding one of the secondary cells 14.

FIG. 8 is a simplified perspective view of an example of the control circuit board 15. As mentioned above, the control circuit board 15 includes the integrated circuits (IC chips) 151, the capacity adjusting circuits 152 and the printed circuit board 153. Moreover, the control circuit board 15 further includes a plurality of connectors 154 and a control circuit (IC chip) 155. The printed circuit board 153 has wiring patterns formed therein. The integrated circuits 151 and the capacity adjusting circuits 152 are mounted on the front and back sides of the printed circuit board 153 in a matrix-like arrangement. FIG. 8 shows twelve integrated circuits 151 and twelve capacity adjusting circuits 152 for the illustration purpose. However, it will be apparent to those skilled in the art from this disclosure that the invention is not limited to the arrangement illustrated in FIG. 8. If, for example, the battery pack 1 has sixty thin secondary cells 14, then there will be sixty capacity adjusting circuits 152 and sixty integrated circuits 151 (i.e., one of each for adjusting the capacity of each secondary cell 14) mounted to the printed circuit board 153. Moreover, each of the integrated circuits 151 includes a voltage detection circuit 151a configured to detect a voltage across a corresponding one of the secondary cells 14 as shown in FIG. 1. FIG. 1 illustrates the correspondence between the secondary cells 14, the capacity adjusting circuits 152 and the voltage detection circuits 151a. Additionally, the connectors 154 have input/output terminals. The control circuit 155 is configured to control the entire battery pack system 100 as a whole.

More specifically, the control circuit 155 preferably includes a microcomputer with a battery pack capacity adjusting control program that controls the integrated circuits 151 and the capacity adjusting circuits 152 as discussed below. The control circuit 155 can also include other conventional components such as a storage devices such as a ROM (Read Only Memory) device and a RAM (Random Access Memory) device. The microcomputer of the control circuit 155 is programmed to control the integrated circuits 151 and the capacity adjusting circuits 152. The memory circuit stores processing results and control programs such as ones for capacity adjusting operation that are run by the processor circuit. The control circuit 155 is operatively coupled to various components of the battery pack system 100 in a conventional manner. The internal RAM of the control circuit 155 stores statuses of operational flags and various control data. The internal ROM of the control circuit 155 stores the preset map and data for various operations. The control circuit 155 is capable of selectively controlling any of the components of the control system in accordance with the control program. It will be apparent to those skilled in the art from this disclosure that the precise structure and algorithms for the control circuit 155 can be any combination of hardware and software that will carry out the functions of the present invention.

Returning to FIG. 7, the battery units 11 sandwiched between the upper and lower end plates 12 are housed inside the battery pack case 17. The battery pack case 17 has an inlet opening 171 for drawing air from the inside of the passenger compartment and an outlet opening 172 for discharging air from the inside of the battery pack case 17. An induction fan 18 is provided in the duct 19 that is connected to the inlet opening 171. The upstream end of the duct 19 is connected to the opening $B_3$ of the rear parcel panel $B_2$ of the vehicle B as illustrated in FIG. 6.

Since the secondary cells 14 (FIG. 1) emit heat when they are charged, the induction fan 18 is operated to draw air from the passenger compartment (cooling air) into the inside of the battery pack case 17 in order to cool the secondary cells 14 of the battery units 11 in the battery pack 1. Most of the air drawn in through the inlet opening 171 of the battery pack case 17 passes through the gaps between the battery units 11 and cools the secondary cells 14 before being discharged from the outlet opening 172. Moreover, a portion of the air is used to cool the control circuit board 15, which is mounted on the upper end plate 12. More specifically, a pair of openings 161 is provided at both ends of the case 16, in which the control circuit board 15 is housed, along the direction of the air flow to enable air to pass through the inside of the case 16. This air serves to cool the resistors of the capacity adjusting circuits 152 mounted on the control circuit board 15. However, the amount of air that circulates to the case 16 cannot be precisely controlled (i.e., the distribution of induction air between the battery pack 1 and the case 16 of the control circuit board 15 cannot be precisely controlled). Therefore, the control circuit 155 is configured to control the capacity adjustments of the secondary cells 14 performed by using the resistors of the capacity adjusting circuits 152 in a manner that will now be explained in accordance with the first embodiment of the present invention.

First, the electrical features of the battery pack system 100 including the battery pack capacity adjusting device in accordance with the first embodiment will be explained with reference to FIG. 1.

In the battery pack 1 of the first embodiment, the secondary cells 14 are connected together in series as shown in FIG. 1. A vehicle load 2, e.g., a starter motor or a drive motor for an electric car, is connected to both positive and negative ends of the battery pack 1.

One of the voltage detection circuits 151a and one of the capacity adjusting circuits 152 are connected to a corresponding one of the secondary cells 14. Each of the voltage detection circuits 151a is configured to detect a voltage value of the respective secondary cell 14 and to send the detected voltage value to the control circuit 155. Each of the capacity adjusting circuits 152 includes the resistor and other components for adjusting the capacity of the secondary cell 14. The voltage detection circuits 151a are, for example, built into the integrated circuits 151 shown in FIG. 8. The battery pack system 100 also includes an isolation circuit 155a shown in FIG. 1. The isolation circuit 155a is an insulated signal transferring circuit configured to transfer signals between the control circuit 155 and the voltage detection circuits 151a and the capacity adjusting circuits 152 provided with respect to each of the secondary cells 14. The isolation circuit 155a uses a photocoupler or the like to execute the signal transfers in an electrically insulated manner. The isolation circuit 155a is, for example, built into the control circuit 155 as shown in FIG. 8.

As shown in FIG. 1, the battery pack system 100 is also coupled to a total voltage sensor 4, a current sensor 5, and an auxiliary battery 3D. The total voltage sensor 4 is configured to detect the voltage value of the battery pack 1 as a whole. The current sensor 5 is configured to detect the current flowing through the battery pack 1 as a whole. The auxiliary battery 3D is configured and arranged to supply electric power for driving the control circuit 155.

Moreover, the battery pack system 100 of the first embodiment is preferably coupled to various sensors including a cooling medium temperature sensor A, an induction fan rotational speed sensor 3B and a plurality of secondary cell temperature sensors 3C. The cooling medium temperature sensor 3A is provided inside the duct 19 or the passenger compartment to detect a temperature of the cooling air. The fan rotational speed sensor 3B is configured to detect a rotational speed of the induction fan 18. The temperature of the cooling air detected by the cooling medium temperature sensor 3A and the rotational speed detected by the induction fan rotational speed sensor 3B are fed to the control circuit 155.

In order to determine the heat radiation amount of the control circuit board 15 in an indirect manner, the secondary cell temperature sensors 3C are configured and arranged to determine the heat emission amounts of the secondary cells 14. As seen in FIG. 7, the secondary cell temperature sensors 3C are provided inside the case 17 of the battery pack system 100 to detect the temperatures Tb of the secondary cells 14. The temperatures Tb detected by the secondary cell temperature sensors 3C are sent to the control circuit 155. The temperatures Tb detected by the secondary cell temperature sensors 3C are used to determine the heat emission amount Qi of the secondary cells 14. Then, the energy amount Qb corresponding to a cooling energy (heat radiation amount) of the control circuit board 15 is obtained by subtracting the heat emission amount Qi of the secondary cells 14 from the heat radiation amount Q0 resulting from the operation of the induction fan 18 (i.e., Qb=Q0−Qi).

It is also acceptable to provide one or more temperature sensors Y for directly detecting the temperature of the control circuit board 15 instead of using the secondary cell temperature sensors 3C. Such temperature sensors Y can be provided, for example, in appropriate positions (see FIG. 8) on the printed circuit board 153 to directly measure the temperature in the vicinity of the integrated circuits 151 and the control circuit 155. In such case, the measured temperature can be used to determine the cooling energy (heat radiation amount) of the control circuit board 15.

In the first embodiment, the maximum number of the secondary cells 14 whose capacities can be adjusted simultaneously is determined based on a relationship between the temperature and the flow rate of the cooling air flowing across the control circuit board 15 (i.e., the heat radiation amount of the control circuit board 15) and the heat emission amount of the capacity adjusting circuits 152 (i.e., the heat emission amount of the resistors). When the excess current is passed through the resistors of the capacity adjusting circuits 152 during the capacity adjustment, the resistors of the capacity adjusting circuits 152 emit heat which can cause the integrated circuits 151 and the control circuit 155 mounted on the control circuit board 15 to exceed a limit temperature. However, if the heat radiation amount of the control circuit board 15 is large (i.e., if the cooling energy with respect to the control circuit board 15 is large), then the capacities of a large number of the secondary cells 14 can be adjusted simultaneously because the emitted heat can be absorbed, and thus, the capacity adjustments can be accomplished efficiently without overheating the integrated circuits 151 and the control circuit 155. On the other hand, if the heat radiation amount of the control circuit board 15 is small (i.e., if the cooling energy with respect to the control circuit board 15 is small), then the integrated circuits 151 and the control circuit 155 can be prevented from overheating by adjusting the capacities of a number of secondary cells 14 that is appropriate in view of the smaller cooling ability.

The method of setting the number of secondary cells whose capacities can be adjusted simultaneously based on the cooling energy will now be explained. Since the cooling air that flows across the control circuit board 15 is drawn from the passenger compartment, the temperature detected by the cooling medium temperature sensor 3A is used as the temperature of the cooling air. Also, since the flow rate of the cooling air flowing across the control circuit board 15 correlates to the rotational speed of the induction fan 18, the cooling air flow rate is computed based on the rotational speed of the induction fan 18. It is acceptable to use a preset map to determine the air flow rate. On the other hand, the magnitude of the capacity adjustment that each of the secondary cells 14 requires is computed based on the deviation between the current charge capacity of each secondary cell 14 and a target value. Then, the heat emission amount that will be generated in each of the resistors of the capacity adjusting circuits 152 as a result of the capacity adjustments is calculated.

The maximum number of secondary cells 14 whose capacities can be adjusted simultaneously is then calculated based on a relationship between the heat emission amount of the resistors of the capacity adjusting circuits 152 and the combination of the air temperature and the rotational speed of the induction fan 18.

For example, if the temperature of the cooling air is high and the rotational speed of the induction fan 18 is low, then the ability to cool the control circuit board 15 will be very small. In such a case, if the amounts by which the capacities of the secondary cells 14 need to be adjusted are large, then the maximum number of secondary cells 14 that can be adjusted simultaneously will be small. On the other hand, if the amounts by which the capacities need to be adjusted are small, then the maximum number of secondary cells 14 that can be adjusted simultaneously is not necessarily small, i.e., a fairly considerable number of secondary cells 14 can be adjusted simultaneously. In a know capacity adjusting method (e.g., the method disclosed in the reference mentioned above in the background), only the heat radiation capacity (i.e., the cooling effect) of the control circuit board 15 is taken into account and the capacities of only a small number of secondary cells are adjusted when the cooling effect is small. Consequently, the capacity adjustment time is longer. Meanwhile, with the method of this embodiment, even if the cooling effect is small, a larger number of secondary cells can be adjusted simultaneously when the capacity adjustment amounts are small (i.e., when the heat emission amounts of the resistors of the capacity adjusting circuits 152 are small). Therefore, the capacity adjustments can be accomplished in a shorter amount of time.

In addition to the relationship between the capacity adjustment amount and the cooling ability with respect to the control circuit board 15, the total capacity adjustment time is also affected by the capacity adjustment times of the individual secondary cells 14. Therefore, when the maximum number of secondary cells 14 has been determined and the final selection of the secondary cells 14 whose capacities will be adjusted is being made, the secondary cells 14 are selected such that priority is given to those secondary cells 14 for which the deviation between a charge capacity of the secondary cell 14 and a charge capacity target value is large (i.e., for which the capacity adjustment time will be long). In other words, the secondary cells 14 are prioritized for adjusting the capacities according to the deviation amounts so that the secondary cell 14 having a larger deviation is given priority over the secondary cell 14 having a smaller deviation.

Since the rotational speed of the induction fan 18 can be controlled, the heat radiation amount of the control circuit board 15 can be calculated based solely on the temperature of the cooling medium to control the rotational speed of the induction fan 18.

In order to calculate the heat radiation amount of the control circuit board 15 (i.e., the cooling energy with respect to the control circuit board 15), it is also acceptable to determine the cooling energy resulting from the operation of the induction fan 18 and the amount of heat that will be emitted from the secondary cells 14 and then subtract the amount of cooling energy that will be used to cool the secondary cells 14 from the cooling energy of the induction fan 18.

Referring now to the flowchart of FIG. 2, the control processing for adjusting the capacities of the secondary cells 14 executed by the control circuit 155 in the first embodiment will now be explained.

In step ST10, the control circuit 155 is configured to determine if the battery pack system 100 is in a capacity adjustment mode. There are no particular limits on the timing of the capacity adjustment, but examples include when the vehicle is started (the ignition switch is turned on) and when the vehicle is stopped (the ignition switch is turned off). It is also possible to conduct the capacity adjustment when the vehicle is traveling. If the battery pack system 100 is in the capacity adjustment mode (Yes in step ST10), then the control circuit 155 proceeds to step ST20.

In step ST20, the control circuit 155 is configured to acquire the capacity of each of the secondary cells 14 of the battery pack 1 in the form of a voltage value Vc detected by the respective voltage detection circuit 151a. The control circuit 155 is also configured to acquire a current value I from the current sensor 5, a cooling air temperature Tr from the cooling medium temperature sensor 3A, and secondary cell temperatures Tb from the secondary cell temperature sensors 3C. The control circuit 155 is further configured to acquire a fan rotational speed Nb of the induction fan 18.

In step ST30, the control circuit 155 is configure to compute an internal resistance R of the secondary cells 14 based on the secondary cell voltages Vc, the current value I, and the secondary cell temperatures Tb. The control circuit 155 is further configured to compute a heat emission amount Qi of the secondary cells 14 based on the internal resistance R and the current value I.

In step ST40, the control circuit 155 is configured to compute a cooling energy (heat radiation amount) Q0 supplied to the battery pack system 100 as a whole based on the cooling air temperature Tr and the rotational speed Nb of the induction fan 18.

The cooling energy (heat radiation amount) Q0 supplied to the entire battery pack system 100 is used to cool both the secondary cells 14 of the battery pack 1 and the control circuit board 15 as discussed above. Therefore, in the next step ST50, the cooling energy (heat radiation amount) Qb that can be used to cool the control circuit board 15 is calculated by subtracting the heat emission amount Qi of the secondary cells 14 from the heat radiation amount Q0 (cooling energy) (Qb=Q0−Qi).

In step ST60, the control circuit 155 is configured to determine a capacity adjustment target voltage Vct based on the voltages Vc of the individual secondary cells 14 acquired in step ST20. Then, the control circuit 155 is further configured to calculate the amount of deviation Vchn of the voltage Vc of each secondary cell 14 from the capacity adjustment target voltage Vct by subtracting the capacity adjustment target voltage Vct from the voltage Vc (Vchn=Vc−Vct). The control circuit 155 is then configured to determine an order of priority of the secondary cells 14 for performing the capacity adjustment by ordering the secondary cells 14 from the secondary cell 14 having the largest deviation Vchn to the secondary cell 14 having the smallest deviation Vchn. The ordered voltage values are expressed as Vcnk (k=1, 2, 3, . . . ).

In step ST70, the control circuit 155 is configured to determine the maximum number of secondary cells 14 whose capacity can be adjusted simultaneously without exceeding the heat radiation amount Qb of the control circuit board 15 calculated in step ST50. More specifically, the control circuit 155 is configured to calculate a heat emission amount Qbnk (k=1, 2, 3, . . . ) of each of the resistors of the capacity adjusting circuits 152 based on the resistance value Rb (known in advance) of the resistor and a voltage Vcnk (k=1, 2, 3, . . . ) of the corresponding secondary cell 14 in the order of priority determined in step ST60. Then, the control circuit 155 is configured to calculate the maximum value of k (k=1, 2, 3, . . . ) for which the summation value ΣQbnk does not exceed the heat radiation amount Qb of the control circuit board 15 calculated in step ST50. In other words, the control circuit 155 is configured to determine the maximum value kmax for which the condition ΣQbnk≦Qb is satisfied.

In step ST75, the control circuit 155 is configured to fine adjust or fine tune the rotational speed Nb of the induction fan 18 in consideration of a heat emission amount Qbkmax that will be generated from the resistors of the capacity adjusting circuits 152 when the capacities of the number of secondary cells 14 determined in step ST170 are adjusted. It is possible to omit the control process in step ST75.

After the number and order of priority of the secondary cells 14 that will be adjusted simultaneously is determined, the control circuit 155 proceeds to step ST80.

In step ST80, the control circuit 155 is configured to start the capacity adjustment of the selected secondary cells 14 (i.e., adjust the capacities of the determined number of the secondary cells 14). This operation executed in step ST80 is accomplished by the control circuit 155 shown in FIG. 1 sending a capacity adjustment signal to the capacity adjusting circuits 152 of the selected secondary cells 14 such that a current is passed through the resistors of the capacity adjusting circuits 152 for a prescribed amount of time.

In step ST90, the control circuit 155 is configured to monitor if the capacity adjustment of any one of the secondary cells 14 has finished. If the capacity adjustment of one of the secondary cells has ended (Yes in step ST90), then the control circuit 155 proceeds to step ST100.

In step ST100, the control circuit 155 is configured to determine if the capacity adjustments of all of the secondary cells 14 are finished. If there is a remaining secondary cell 14 to which the capacity adjustment has not been completed (No in step ST100), then the control circuit 155 proceeds to step ST110.

In step ST110, the control circuit 155 is configured to select the next secondary cell 14 in the order of priority. Then, the control circuit 155 returns to step ST80 and starts the capacity adjustment of the selected secondary cell 14. The control circuit 155 repeats this routine until the control circuit 155 determines in step ST100 that the capacity adjustments of all of the secondary cells 14 have been finished. The control circuit 155 then ends the processing of the flowchart.

In the first embodiment, the maximum number of secondary cells 14 whose capacity can be adjusted simultaneously is determined based not solely on the heat emission amount of the resistors of the capacity adjusting circuits 152 (which produce heat) but also on a relationship between the heat emission amount and the temperature and flow rate of the cooling medium supplied to the control circuit board 15 on which the capacity adjusting circuits 152 are mounted, i.e., the cooling energy (heat radiation amount) of the control circuit board 15. As a result, the capacity adjustments can be executed efficiently and in a short amount of time without overheating the control circuit board 15.

Second Embodiment

Figure 4:
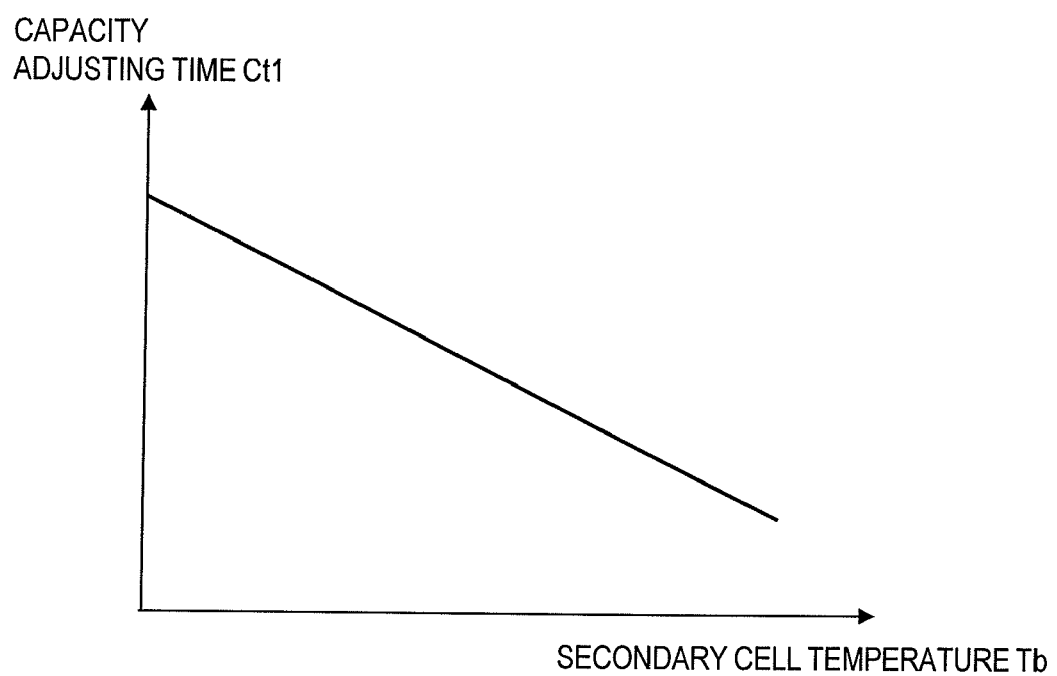
FIG. 4 is a control map plotting the capacity adjusting time versus the secondary cell temperature used by the battery pack capacity adjusting device in accordance with the second embodiment of the present invention.

Referring now to FIGS. 3 and 4, a battery pack capacity adjusting device and method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The battery pack capacity adjusting device of the second embodiment is identical to the battery pack capacity adjusting device of the first embodiment illustrated in FIGS. 1 and 6-8 except that, in the second embodiment, the control circuit 155 is configured to execute control processing shown in the flowchart of FIG. 3 prior to step ST10 of the control flow shown in FIG. 2.

When a prescribed amount of time has elapsed since the battery pack system 100 was stopped (e.g., the ignition switch of the vehicle was turned off), the control circuit board 15 is well cooled and the number of secondary cells 14 whose capacity can be adjusted simultaneously is larger than when the vehicle is being driven normally, although the number of cells that can be adjusted also depends on the temperature of the cooling medium. Therefore, in the second embodiment, when the battery pack system 100 is started (e.g., when the ignition switch of the vehicle is turned on), the degree to which the control circuit board 15 is cooled is estimated based on a determination of how long the battery pack system 100 was stopped. If the control circuit board 15 is estimated to be sufficiently cooled, then all of the secondary cells 14 can be adjusted simultaneously.

The control flow for adjusting the capacities of all the secondary cells 14 all at once in accordance with the second embodiment is shown in FIG. 3. As mentioned above, the control circuit 155 is configured to execute the control logic shown in FIG. 3 before starting the control processing in step ST10 of the control flow shown in FIG. 2.

In step ST1, the control circuit 155 is configured to acquire the temperatures Tb of the secondary cells 14 from the secondary cell temperature sensors 3C, the temperature Tr of the cooling air from the cooling medium temperature sensor 3A, and the total voltage V of the secondary cells 14 from the total voltage sensor 4. Prior to the control processing in step ST1, the control circuit 155 has stored the total voltage Vm that existed at the time of the previous control cycle, i.e., at the time when the battery pack system 100 was stopped.

In step ST2, the control circuit 155 is configured to determine if the difference between the previously stored total voltage Vm and the current total voltage V corresponding to when the battery pack system 100 is started, i.e., the voltage difference Vm−V, is larger than a prescribed voltage V1 (which is preferably determined in advance experimentally). If the voltage difference is larger than the prescribed voltage V1 (Yes in step ST2), then the control circuit 155 determines that the voltage difference is the result of self-discharge occurring during the period when the secondary cells 14 were stopped and that the prescribed amount of time has elapsed. The control circuit 155 then proceeds to step ST3. On the other hand, if the control circuit 155 determines in step ST2 that the voltage difference Vm−V is smaller than the prescribed voltage V1 (No in step ST2), then the control circuit 155 determines that the prescribed amount of time has not elapsed since the battery pack system 100 has stopped (which corresponds to the previous control cycle) and the control circuit board 15 is not sufficiently cooled. Therefore, the control circuit 155 proceeds to step ST10 in FIG. 2 to perform the capacity adjustment control that includes limiting the number of secondary cells 14 to be adjusted as discussed in the first embodiment.

In step ST3, the control circuit 155 is configured to determine an amount of time for adjusting the capacities of all of the secondary cells 14 all at once in the subsequent step. More specifically, the control circuit 155 is configured to refer to a map corresponding to the capacity adjusting time Ct1 versus secondary cell temperature Tb relationship such as one shown in FIG. 4. The capacity adjusting time Ct1 is an amount of time over which the secondary cells 14 can be adjusted all at once without the temperature of the control circuit board 15 reaching an extreme value. As shown in FIG. 4, the secondary cell temperature Tb becomes lower as the capacity adjusting time Ct1 becomes longer. Therefore, the capacities of the secondary cells 14 can be adjusted all at once over a long amount of the capacity adjusting time Ct1.

In step ST4, the control circuit 155 is configured to adjust the capacities of all of the secondary cells 14 at once. During this capacity adjustment, the capacity of each of the secondary cells 14 is adjusted by the amount of deviation between the capacity of the secondary cell 14 and the capacity adjustment target value. Then, the control circuit 155 is configured to execute a control for ending the capacity adjustments in order from the secondary cells 14 whose capacity adjustments are finished.

In step ST5, the control circuit 155 is configured to increment a timer value Ct and then to determine if the timer value Ct has exceeded the capacity adjusting time Ct1 set in step ST3. The all-at-once capacity adjustment of step ST4 is repeated until the capacity adjusting time Ct1 has been reached. When the capacity adjusting time Ct1 set in step ST3 has elapsed, the control circuit 155 proceeds to step ST10 of FIG. 2 and executes the control shown in the flowchart of FIG. 2 as explained in the first embodiment.

By executing the control shown in FIG. 3 when the battery pack system 100 is started, the capacities of the battery pack 1 can be kept more uniform and the capacity adjustment time can be greatly shortened in comparison with executing capacity adjustments only when the vehicle is being driven normally.

Third Embodiment

Figure 5:
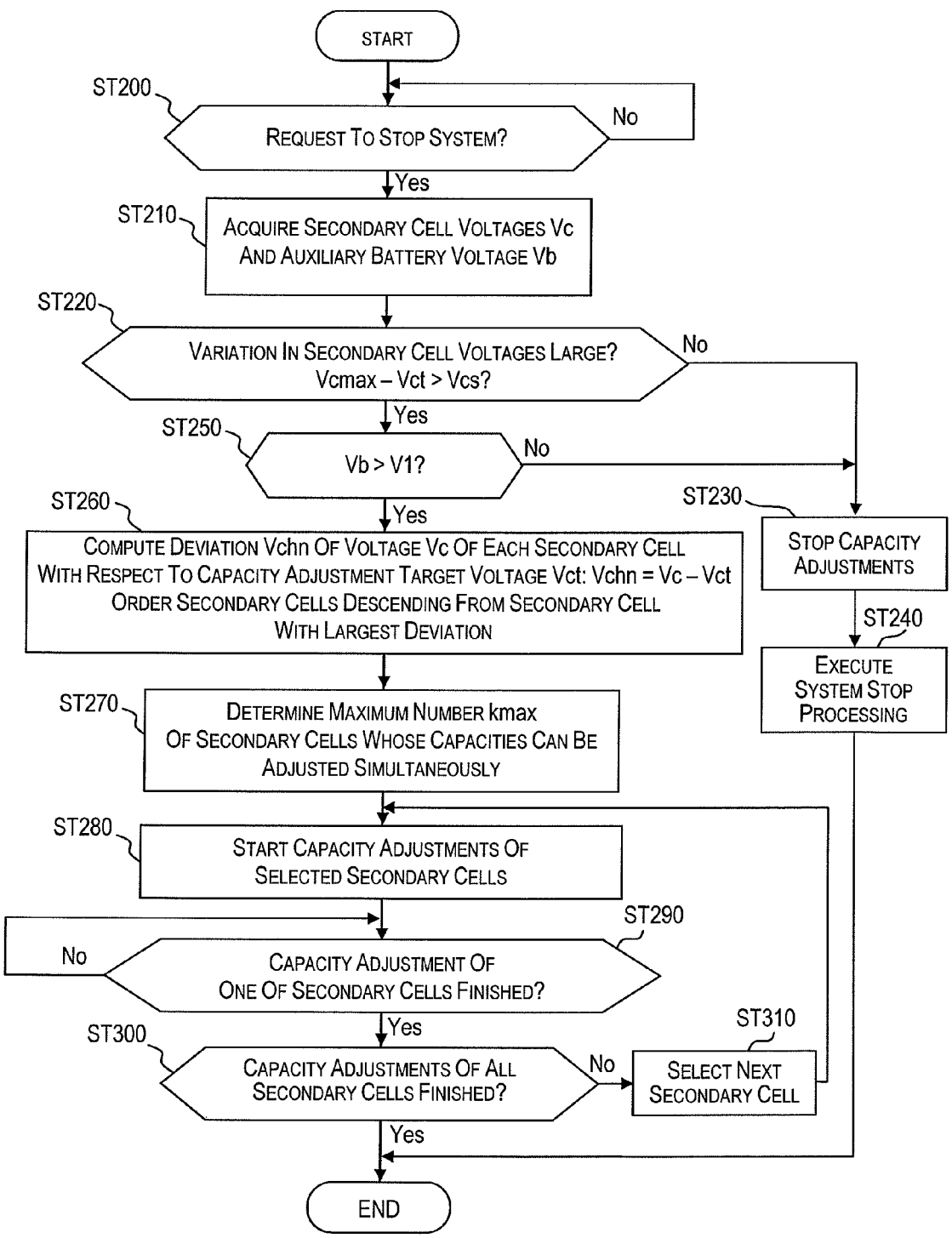
FIG. 5 is a flowchart illustrating the control processing executed by the battery pack capacity adjusting device in accordance with a third embodiment of the present invention.

Referring now to FIG. 5, a battery pack capacity adjusting device and method in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The battery pack capacity adjusting device and method of the third embodiment is identical to the battery pack capacity adjusting device and method of the first embodiment illustrated in FIGS. 1 and 6-8 except that the control circuit 155 is configured to execute a control flow shown in the flowchart of FIG. 5 in the third embodiment, instead of the flowchart of FIG. 2. More specifically, in the third embodiment of the present invention, the control circuit 155 is configured to perform the capacity adjustment of the secondary cells 14 when the battery pack system 100 is stopped according to the flowchart of FIG. 5. In the third embodiment, if the voltage Vb of the auxiliary battery 3D that supplies electric power to the control circuit 155 is sufficient at the time when the battery pack system 100 is stopped, then the control circuit 155 is configured to execute a capacity adjustment even after the battery pack system 100 is stopped if the capacity adjustment of the secondary cells 14 is necessary. It will be apparent to those skilled in the art from this disclosure that the control circuit 155 can be configured to execute the control flow shown in the flowchart of FIG. 5 when the battery pack system 100 is stopped in addition to executing the control flow shown in the FIG. 2 during the battery pack system 100 is operating, or in addition to executing the control flows shown in FIGS. 2 and 3.

In step ST200, the control circuit 155 is configured to determine if there is a request to stop the battery pack system 100. If there is a request to stop the battery pack system 100 (Yes in step ST200), then the control circuit 155 proceeds to the subsequent steps as described below.

More specifically, in step ST210, the control circuit 155 is configured to acquire the voltages Vc of the secondary cells 14 and the voltage Vb of the auxiliary battery 3D.

In step ST220, the control circuit 155 is configured to determine if there is enough variation (scatter) among the charge capacities of the secondary cells 14 to require adjusting the capacities. In the third embodiment, the capacity adjustment is executed when the voltage difference between the maximum value Vcmax among the voltages Vc of the secondary cells 14 and the capacity adjustment target value Vct is larger than a prescribed value Vcs (an example of a condition in which the amount of capacity variation required to trigger a capacity adjustment).

In step ST220, if the capacity variation required for adjusting the capacities does not exist (No in step ST210), then the control circuit 155 is configured to stop executing the capacity adjustments in step ST230, and to execute processing to stop the battery pack system 100 in step ST240.

On the other hand, if the control circuit 155 determines in step ST220 that the capacity variation required for adjusting the capacities exists (Yes in step ST220), then the control circuit 155 proceeds to step ST250.

In step ST250, the control circuit 155 determines if the auxiliary battery 3D has a voltage V1 sufficient for executing the capacity adjustment. If the voltage is sufficient (Yes in step ST250), then the control circuit 155 proceeds to step S260. If the voltage is not sufficient (No in step ST250), then the control circuit 155 proceeds to step ST230 to stop the capacity adjustment and stop the battery pack system 100.

The control processing executed in steps ST260, ST270, ST280, ST290, ST300 and ST310 are the same as the control processing for capacity adjustment executed in steps ST60, ST70, ST80, ST90, ST100 and ST110 of FIG. 2, respectively.

In the third embodiment, since the required capacity adjustments are executed when the battery pack system 100 is stopped so long as the voltage of the auxiliary battery 3D has a sufficient voltage, the battery pack system 100 can be operated in a state in which the capacities of the secondary cells 14 are adjusted the next time the battery pack system 100 is started.

According to the illustrated embodiments of the present invention, the battery pack adjusting device is configured to determine a number of the secondary cells 14 whose capacity can be adjusted together based on the relationship between the heat radiation amount of the control circuit board 15 on which a capacity adjusting section (e.g., the resistors of the capacity adjusting circuits 152) (which is a heat source) is mounted and the heat emission amount of the capacity adjusting section. As a result, the capacity adjustments can be executed efficiently in accordance with the degree to which the control circuit board 15 can be cooled. In other words, if the degree to which the control circuit board 15 can be cooled is large, then the capacities of a large number of secondary cells are adjusted together. On the other hand, if the degree to which the control circuit board 15 can be cooled is small, then the capacities of an appropriate smaller number of secondary cells 14 are adjusted together with the smaller number being determined in accordance with the degree to which the control circuit board 15 can be cooled. In this way, the temperature of the control circuit board 15 is not suppressed beyond what is necessary and the time required for the capacity adjustments can be shortened.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A battery pack capacity adjusting device for adjusting a capacity of a battery pack having a plurality of secondary cells, the capacity adjusting device comprising:
    a control circuit board installable in the battery pack, the control circuit board including a capacity adjusting section to be electrically connected to the secondary cells to adjust a capacity of each of the secondary cells; and
    a control section configured to determine a number of the secondary cells whose capacities are adjustable together based on a relationship between a heat radiation amount of the control circuit board and a heat emission amount of the capacity adjusting section, and to control the capacity adjusting section to adjust the capacities of the number of the secondary cells that were determined to be adjustable together.

2. The battery pack capacity adjusting device as recited in claim 1, further comprising
    a control circuit board temperature detecting section configured and arranged to detect a temperature of the control circuit board,
    a cooling medium temperature detecting section configured and arranged to detect a temperature of a cooling medium supplied to the control circuit board, and
    a flow rate detecting section configured and arranged to detect a flow rate of the cooling medium,
    the control section being further configured to determine the heat radiation amount of the control circuit board based on the temperature of the control circuit board, the temperature of the cooling medium and the flow rate of the cooling medium.

3. The capacity adjusting device as recited in claim 1, further comprising
    a voltage sensor configured and arranged to detect a voltage of each of the secondary cells,
    the control section being further configured to calculate a deviation amount between a prescribed target voltage and each of the voltages of the secondary cells detected by the voltage sensor, and to prioritize the secondary cells for adjusting the capacities according to the deviation amounts so that the secondary cell having a larger deviation is given priority over the secondary cell having a smaller deviation.

4. The capacity adjusting device as recited in claim 2, wherein
    the control section is configured to control the flow rate of the cooling medium based on the heat emission amount of the capacity adjusting section.

5. The battery pack capacity adjusting device as recited in claim 1, further comprising
    a total voltage sensor configured and arranged to detect a total voltage of the battery pack,
    the control section being further configured to determine whether a difference between the total voltage of the battery pack when the battery pack is stopped and the total voltage of the battery pack when the battery pack is restarted is larger than a prescribed value, and to adjust the capacities of all the secondary cells when the difference is larger than the prescribed value.

6. The battery pack capacity adjusting device as recited in claim 1, further comprising
    an auxiliary battery configured and arranged to supply electric power to the control section,
    the control section being further configured to adjust the capacities of the secondary cells when a voltage of the auxiliary battery is equal to or higher than a prescribed voltage after a request to stop the battery pack is received.

7. A battery pack capacity adjusting method for adjusting a capacity of a battery pack having a plurality of secondary cells, the battery pack capacity adjusting method comprising:
selectively adjusting capacities of the secondary cells by using a capacity adjusting section;
calculating a heat radiation amount of a control circuit board on which the capacity adjusting section is mounted;
calculating a heat emission amount of the capacity adjusting section; and
determining a number of the secondary cells whose capacities are adjustable together based on a relationship between the heat radiation amount of the control circuit board and the heat emission amount of the capacity adjusting section,
the selectively adjusting of the capacities of the secondary cells including adjusting the capacities of the number of secondary cells that were determined to be adjustable together.

8. A battery pack capacity adjusting device for adjusting a capacity of a battery pack having a plurality of secondary cells, the battery pack capacity adjusting device comprising:
capacity adjusting means for selectively adjusting capacities of the secondary cells;
heat radiation amount calculating means for calculating a heat radiation amount of a control circuit board of the battery pack on which the capacity adjusting means is mounted;
heat emission amount calculating means for calculating a heat emission amount of the capacity adjusting means; and
control means for determining a number of the secondary cells whose capacities are adjustable together based on a relationship between the heat radiation amount of the control circuit board and the heat emission amount of the capacity adjusting means, and for controlling the capacity adjusting means to adjust the capacities of the number of secondary cells that were determined to be adjustable together.

* * * * *